United States Patent
Paar et al.

(10) Patent No.: US 6,572,972 B2
(45) Date of Patent: Jun. 3, 2003

(54) AQUEOUS BINDERS

(75) Inventors: Willibald Paar, Graz (AT); Maximilian Friedl, Gratkorn (AT)

(73) Assignee: Solutia Austria GmbH, Werndorf (AT)

( * ) Notice: Subject to any disclaimer, the term of this patent is extended or adjusted under 35 U.S.C. 154(b) by 0 days.

(21) Appl. No.: 09/929,330

(22) Filed: Aug. 14, 2001

(65) Prior Publication Data

US 2003/0021999 A1 Jan. 30, 2003

(30) Foreign Application Priority Data

Jun. 15, 2001 (AT) ............................................ 932/2001

(51) Int. Cl.⁷ ............................................... B32B 27/38
(52) U.S. Cl. ........................ 428/418; 523/412; 523/409
(58) Field of Search ................. 428/418, 413; 523/412, 409; 528/103

(56) References Cited

U.S. PATENT DOCUMENTS

| | | | |
|---|---|---|---|
| 4,996,250 A | 2/1991 | Awad et al. | |
| 5,089,342 A | 2/1992 | Dhein et al. | |
| 5,589,535 A | 12/1996 | Schwab et al. | |
| 5,932,636 A | * 8/1999 | Neumann et al. | 523/412 |

FOREIGN PATENT DOCUMENTS

| | | |
|---|---|---|
| CA | 2175531 | 11/1996 |
| EP | 0 070 704 A2 | 1/1983 |
| EP | 0 312 733 A2 | 4/1987 |
| EP | 0 267 562 A2 | 5/1988 |
| EP | 0 355 761 A2 | 2/1990 |
| EP | 0 316 732 A2 | 5/1998 |
| WO | WO92/09667 | 6/1992 |

OTHER PUBLICATIONS

Abstract, EP 0741156 A1, Zoller et al., Nov. 6, 1996.*
Abstract, DE 0444454 A2, Schwab et al., Sep. 4, 1991.*
Abstract, DE 0370299 A1, Dhein et al., May 30, 1990.*
Abstract, DE 390261 B, Zuckert et al., Feb. 26, 1991.*

* cited by examiner

Primary Examiner—Robert Dawson
Assistant Examiner—Christopher M. Keehan
(74) Attorney, Agent, or Firm—ProPat, L.L.C.

(57) ABSTRACT

Aqueous binders comprising organic bismuth compounds and reaction products, having a number-average molar mass $M_n$ of at least 5000 g/mol, of epoxy resins, optionally fatty acids and amines are obtained by reacting epoxide compounds containing at least two epoxide groups per molecule and reaction products of epoxide compounds, optionally fatty acids and amines, and are suitable as binders for aqueous systems for corrosion protection.

18 Claims, No Drawings

AQUEOUS BINDERS

FIELD OF THE INVENTION

The invention relates to aqueous binders.

BACKGROUND OF THE INVENTION

Air-drying resins or binders are known in particular in the field of alkyd resins; water-dilutable alkyd resins are obtained by mixing (unmodified) alkyd resins with emulsifiers or by incorporating a sufficient number of acid groups which remain following the condensation reaction and neutralizing at least some of them, or by cocondensation with hydrophilic polyoxyalkylene polyols such as polyethylene glycol.

For example, hydroxy-functional emulsifiers for alkyd resins based on polyurethane polyureas are known from EP-A 0 741 156. Other externally emulsified aqueous alkyd resin compositions are described in EP-A 0 593 487. Alkyd resins with a chemically incorporated emulsifier (self-emulsifying) are known from EP-A 0 312 733.

In all cases, compatibility with water is achieved by using nonionic or anionic emulsifiers, in chemically incorporated or added form.

It is also known to modify polyurethane resins, by incorporating unsaturated fatty acids (EP-A 0 444 454), in such a way that coating materials prepared using them are air-drying.

Resins containing epoxide groups, which by modification with fatty acids lead to air-drying binders, are described in EP-A 0 355 761 (esters of fatty acids with epoxy resins), 0 316 732, 0 370 299 (acrylic resins containing epoxide groups) and 0 267 562 (epoxide-ester resins, urethane-alkyd resins or alkyd resins grafted with olefinically unsaturated monomers in an aqueous medium).

Aqueous formulations of neutralized reaction products comprising epoxy resin-amine adducts and fatty acids are known from EP-A 0 070 704. Here, starting from amines and epoxy resins based on polyhydric phenols, adducts with a molar mass of from 1000 to 3000 g/mol are prepared and are subsequently reacted with unsaturated fatty acids to give a product in which the mass fraction of these fatty acids is from 25 to 50%. The amount of the fatty acids in this case is to be chosen such that all of the active amine hydrogen atoms are consumed.

AT-B 390 261 discloses epoxy resin ester emulsions which can be used as binders for air-drying coating materials. The resins are prepared by reacting epoxy resins, partially esterified with fatty acids, and copolymers of unsaturated fatty acids and (meth)acrylic acid, and also further copolymerizable monomers, and to achieve dilutability in water are at least partly neutralized with alkalis. These resins may also be admixed with amino-functional epoxy resin esters.

SUMMARY OF THE INVENTION

It has now been found that reaction products of epoxy resins and (optionally fatty-acid-modified) epoxide-amine adducts with an addition of bismuth compounds may be used as binders for air-drying and physically drying coating materials which bring about excellent corrosion protection on metallic substrates.

The invention accordingly provides aqueous binders comprising bismuth compounds D and reaction products A'ABC of epoxy resins A' containing at least two epoxide groups per molecule and reaction products ABC of epoxy resins A, optionally fatty acids B and amines C, the number-average molar mass $M_n$ of the reaction products A'ABC being at least 5000 g/mol.

"Aqueous" binders are water-soluble binders and binders which form stable dispersions in water.

DESCRIPTION OF THE PREFERRED EMBODIMENTS

In particular, the molar mass calculated from the stoichiometry (number-average), $M_n$, of these reaction products A'ABC is preferably at least 10,000 g/mol, more preferably at least 15,000 g/mol, and with particular preference at least 20,000 g/mol, and their (measured) acid number is not more than 5 mg/g. Following at least partial neutralization of the amino groups, the reaction products A'ABC can be dispersed in water to give stable dispersions which form no sediment even after the storage at room temperature (20° C.) for 4 weeks.

The epoxy resins A and A' are selected independently of one another from diepoxide or polyepoxide compounds which are obtainable in a known manner by reacting epichlorohydrin with aromatic or (cyclo)aliphatic compounds containing two or more hydroxyl groups per molecule (Taffy process), or may be obtained by reacting diepoxides or polyepoxides with the aforementioned aromatic and (cyclo)aliphatic compounds containing two or more hydroxyl groups per molecule (advancement reaction). Preference is given to epoxy resins based on aromatic dihydroxy compounds, such as bisphenol A, bisphenol F, dihydroxydiphenyl sulfone, hydroquinone, resorcinol, 1,4-bis[2-(4-hydroxyphenyl)-2-propyl]benzene, or aliphatic dihydroxy compounds such as 1,6-hexanediol, 1,4-butanediol, cyclohexanedimethanol, or oligo- and polypropylene glycol having average degrees of polymerization of between 3 and 40. The specific epoxide group content of the epoxy resins is, independently of one another for the epoxy resins A and A', in each case preferably from 0.4 to 7 mol/kg, in particular from 0.6 to 6 mol/kg, the epoxide group content of A' preferably being greater than that of A. In one preferred embodiment, diepoxide compounds are used in each case for A and A', the specific epoxide group contents being from 0.5 to 4 mol/kg in the case of A and from 2 to 5.9 mol/kg in the case of A'.

Particular preference is given to epoxy resins based on bisphenol A and bisphenol F and mixtures thereof.

The optionally used fatty acids B contain at least one olefinic double bond and have from 6 to 30, preferably from 8 to 26, and in particular from 16 to 22 carbon atoms. Preference is given to palmoleic acid, oleic acid and erucic acid; linoleic acid, linolenic acid and eleostearic acid, arachidonic acid and clupanodonic acid, and also the fatty acids obtainable as mixtures from the naturally occurring oils, such as linseed oil fatty acid, soybean oil fatty acid, conjuvandol fatty acid, tall oil fatty acid, cottonseed oil fatty acid, rapeseed oil fatty acid, and the fatty acid mixtures obtained from dehydrated castor oil.

The amines C are preferably aliphatic, linear, cyclic or branched amines which contain at least one primary or secondary amino group. They have preferably from 2 to 12 carbon atoms and may also contain tertiary amino groups and/or hydroxyl groups as functional groups. Particularly suitable are primary monoamines having from 6 to 12 carbon atoms such as hexylamine, cyclohexylamine, 2-ethylhexylamine and stearylamine, primary diamines such as ethylenediamine, 1,4-diaminobutane and 1,6-diaminohexane, primary-tertiary diamines such as dimethylaminopropylamine, diethylaminopropylamine, diprimary-secondary amines such as diethylenetriamine, 1,9-diamino-5-azanonane, 1,13-diamino-7-azatridecane, triethylenetetramine and tetraethylenepentamine, and the mixtures of oligomeric diaminopolyethyleneimines available commercially as ®Polymin, and also secondary amines and diamines such as piperidine, piperazine, di-n-butylamine, morpholine, and hydroxy-functional amines such as ethanolamine, diethanolamine and diisopropanolamine. It is also possible to use mixtures of said amines.

The intermediates ABC may be prepared by sequential reaction (variant I), in which case the epoxide compounds A are first reacted with the amines C to give a product AC and in a second step these adducts are reacted with the fatty acids B to give the intermediate ABC. A further possibility, however (variant II), is first to react the epoxide compounds A with the fatty acids B to give a product AB and then to react the remaining epoxide groups in AB with the amines C. A further possibility (variant III) is to perform the reaction simultaneously and so in one step to arrive at the intermediates ABC. The amounts of the reactants A, B and C are chosen such that substantially all of the epoxide groups, i.e., at least 90%, preferably at least 95%, and in particular at least 98% of the epoxide groups originally present in A, are reacted. Preferably, the reaction is also to be conducted such that the intermediate ABC no longer contains any reactive amine hydrogen atoms; at the most, however, the amount of amine hydrogen atoms may be 10 mmol/kg.

Where no fatty acids B are used, the reaction of the epoxide A with the amine C is carried out in one stage (corresponding to stage 1 of variant I). It is also possible (as described later on below) to use nondrying fatty acids such as palmitic acid or stearic acid instead of the unsaturated fatty acids B, as a result of which, of course, only physically drying binders are obtained. For the sake of simplicity, however, in the text below even reaction products which contain no fatty acids B or only nondrying (saturated) fatty acids are also referred to as "ABC".

A further variant of the present invention comprises, when using amines C containing more than two hydrogen atoms, consuming some of these amine hydrogen atoms by reaction with a monoepoxide A". Accordingly, a primary amino group containing two active amine hydrogen atoms becomes a secondary β-hydroxyamine group, or a secondary amino group becomes a tertiary β-hydroxyamine group.

Suitable monoepoxides A" include any desired aliphatic or aromatic monoepoxides or mixtures thereof, especially glycidyl ethers of monohydric alcohols or phenols such as butyl glycidyl ether, 2-ethylhexyl glycidyl ether, phenyl glycidyl ether, and also glycidyl esters of monobasic acids, preferably aliphatic or aromatic carboxylic acids, such as glycidyl benzoate, glycidyl acetate, glycidyl stearate, and the glycidyl esters of α-branched aliphatic carboxylic acids, such as glycidyl 2-ethylhexanoate, glycidyl 2,2-dimethylpropionate, glycidyl 2,2-dimethyloctanoate, glycidyl 2-methylnonanoate, especially technical-grade mixtures of such branched aliphatic esters, which are available commercially as ®Cardura ES (glycidyl esters of a mixture of α-branched pentanoic acids) or E10 (glycidyl esters of a mixture of α-branched decanoic acids) or ®Glydexx.

In accordance with this variant, the amines C are reduced in their functionality, in whole or in part, prior to the reaction with A or with AB, by the reaction with the monoepoxides A". These modified amines C' are subsequently reacted, alone or in a mixture with the unmodified amines C, with A or with AB (stepwise reaction) or with A and B (conjoint reaction) in the further reaction.

Within the bounds of the invention it is also possible to react the epoxy resins A, before, during or after the reaction with the coreactants B and C, with further compounds E which possess at least one hydrogen atom which is reactive toward epoxide groups and is located in a hydroxyl group or acid group, i.e., alcohols, phenols and acids, especially compounds containing activated hydroxyl groups and acid groups, which are selected preferably from aliphatic diols and polyols such as glycol, propanediol, neopentyl glycol, glycerol, trimethylolpropane, pentaerythritol, ditrimethylolpropane and dipentaerythritol, (substituted) phenols such as phenol itself, the isomeric cresols and xylenols, and also polyhydric and/or polynuclear phenols such as resorcinol, dihydroxybiphenyl, dihydroxydiphenyl sulfone, bisphenol A, α- and β-naphthol, and 2,3- and 2,6-dihydroxynaphthalene, monobasic and polybasic carboxylic acids such as saturated aliphatic linear or branched carboxylic acids having from 2 to 40 carbon atoms, such as isooctanoic acid, stearic acid, the dimeric fatty acids, aromatic carboxylic acids such as benzoic acid, isophthalic and terephthalic acid, sulfonic acids such as benzenesulfonic acid and sulfoisophthalic acid, phosphoric acid, and alkyl- and arylphosphonic acids such as methane- and benzenephosphonic acid.

To prepare the reaction products A'ABC of the invention, the components are reacted preferably in the following amount-of-substance fractions:

per 1 mol of the epoxide compound A, from 0 to 1.0 mol, preferably from 0.1 to 0.9 mol, and with particular preference from 0.25 to 0.8 mol of the fatty acids B, and from 0.5 to 1.9 mol, preferably from 0.6 to 1.75 mol, and with particular preference from 0.65 to 1.5 mol of the amines C are used in the first stage, and then in the second stage from 0.2 to 1.0 mol, preferably from 0.25 to 0.9 mol, with particular preference from 0.3 to 0.8 mol, of the epoxide compound A' is reacted with the adduct from the first stage.

Where compounds E are used, their mole fraction per 1 mol of the epoxide compound A and/or A' is from 0.02 to 0.3 mol, preferably from 0.05 to 0.25 mol, and with particular preference from 0.1 to 0.2 mol. The compounds E may be used before the reaction with B and/or C to modify the epoxide compounds; it is also possible to use them together with components B and/or C.

Where monoepoxide compounds A" are used to modify the amines C, their amount of substance is to be chosen such that the amines C' still possess on average at least one reactive amine hydrogen atom per molecule.

Where the epoxide compounds A and/or A' or the amines C are replaced in whole or in part by these modified compounds in accordance with the two preceding paragraphs, then in each case the mixture or the modified compound is to be used under these conditions for the amount of substance instead of A, A' and C.

The bismuth compounds D are selected from organic bismuth salts and bismuth chelates. The term bismuth chelates used here refers to bismuth compounds containing organic ligands having at least two atoms per molecule that have free electron pairs, and thus possess at least two adjacent coordination sites of the bismuth central atom with the formation, preferably, of a five- or six-membered ring. Chelating agents for bismuth are, in particular, organic hydroxy acids such as glycolic acid, lactic acid, citric acid, tartaric acid, salicylic acid, dimethylolacetic acid and dimethylolpropionic acid, diphenols such as pyrocatechol and tetrabromopyrocatechol, nitrogen-containing aromatic and aliphatic hydroxy compounds such as 8-hydroxyquinoline, α- and β-amino acids such as alanine, β-alanine, serine and glycine, hydroxy mercaptans such as 2,3-dimercaptopropanol, mercapto acids such as thioglycolic acid, and tertiary amino acids such as nitrilotriacetic acid, ethylenediaminetetraacetic acid and diethylenetriaminepentaacetic acid. Organic bismuth salts are derived in particular from strong organic acids such as methanesulfonic acid, trichloroacetic acid, trifluoroacetic acid, and at least dibasic (also chelate-forming) carboxylic acids such as oxalic acid, malonic acid, succinic acid and tricarballylic acid. Preference is given to bismuth salts of amino acids and hydroxy acids, such as bismuth lactate, bismuth glycolate, bismuth bishydroxymethylacetate and bismuth bishydroxymethylpropionate. The bismuth compounds D are used in amounts such that their mass fraction, based on the mass of the solids fraction, is from 0.1 to 20%, the mass fraction of bismuth itself being from 0.01 to 5%, preferably from 0.02 to 4%.

The preparation of the reaction products A'ABC is effected by reaction of components A, B and C preferably in a solvent which is inert under the reaction conditions, at a temperature of from 70 to 150° C., the concentration (mass fraction) of components A, B and C (and also, where used, E) in the solution being from 30 to 85%, preferably from 50 to 80%. As solvents it is preferred to use ether alcohols (alkoxyalkanols having from 3 to 10 carbon atoms) such as methoxypropanol, isopropyl glycol, butyl glycol and 3-methoxy-l-butanol. After the end of the reaction (complete consumption of the epoxide groups), the solution of the adduct ABC is neutralized by adding organic or inorganic acids to a degree of neutralization (percentage fraction of those tertiary amino groups which have been converted into the salt form, based on their overall amount) of from 20 to 90%, preferably from 30 to 85%, and in particular from 40 to 80%, and the (partly) neutralized solution of the adduct is diluted with water to a mass fraction of solids of from 20 to 60%, preferably from 25 to 55%, and with particular preference from 30 to 50%. For this procedure the organic solution may be stirred into (preferably preheated) water, or water may be stirred into the organic solution. It is also possible with preference to add part of the acid used for the neutralization, preferably from 20 to 80%, to the water used for dilution. The acids used for neutralization are preferably selected from boric acid, phosphoric acid, formic acid, acetic acid, lactic acid, citric acid and tartaric acid. Subsequently, the bismuth compound D is added to this aqueous solution; the mixture is homogenized thoroughly. The epoxide compound A' is added slowly to this aqueous solution at a temperature of from 60 to 99° C., preferably from 70 to 97° C., and with particular preference from 75 to 95° C., and the reaction is continued until all of the epoxide groups have been consumed. It is also possible not to add the bismuth compound D until after the reaction of the epoxide A'. Instead of adding the organic or inorganic acids which can be used for neutralization, neutralization may also be brought about simply by adding the (acid-containing) bismuth compound D.

The reaction products A'ABC are suitable for use as binders for preparing aqueous coating compositions which dry physically or in the air by oxidation. The coatings protect the substrate against corrosive attack by acids, alkalis, salt solutions and water. Accordingly, the Bi-catalyzed reaction products of the invention are especially suitable for formulating anticorrosion primers for use on metal sheets or other surfaces of base metals (those below hydrogen in the voltage series), i.e. in particular for sheets of iron, galvanized iron, steel, aluminum, and aluminum alloys. Such coating compositions also include the customary additives such as defoamers, leveling agents, pigments, dispersants, antisettling agents, and thickeners.

Since drying can take place only following application to the substrate (physically or oxidatively), there is no restriction in application in the aqueous binders of the invention by a pot life. In this aspect, they differ advantageously from, for example, two-component (2K) systems which must not be mixed until shortly before application. In comparison to known one-component systems (thermosetting systems) based on epoxy resins, the binders of the invention and the coating materials formulated therefrom feature improved substrate adhesion and improved adhesion of the further paint films applied thereto. Even in thin films above about 15 μm, the corrosion protection properties are already excellent.

EXAMPLES

Example 1

Binders
1.1 Fatty-Acid-Modified Epoxide-Amine Adduct 3420 g of an epoxy resin based on bisphenol A, having a specific epoxide group content of 5.3 mol/kg ("epoxide equivalent weight" EEW=190 g/mol), were reacted with 210 g (2 mol) of diethanolamine, 167 g (1.7 mol) of dimethylaminopropylamine, 407 g (1.8 mol) of bisphenol A and 840 g (3 mol) of tall oil fatty acid at 140° C. until all of the epoxide groups have been consumed.

After cooling to 90° C., 50 mmol of acetic acid were added per 100 g of solid resin and the product was diluted with fully deionized water to a mass fraction of solids (mass fraction of nonvolatiles) of 42%.
1.2 Catalyst Solution A solution of 938.9 g (7 mol) of dimethylolpropionic acid in 2154 g of water was heated to 70° C. 465.96 g of bismuth oxide ($Bi_2O_3$, 1 mol) were gradually added with stirring, a pause being left between each addition to allow the previous addition of oxide to dissolve. Following complete dissolution, the mixture was stirred overnight (14 hours) and then cooled to room temperature (20° C.). The resulting catalyst solution had a metal content of 11.7% and an acid number of 100 mg/g.
1.3 Aqueous Binder 950 g of the catalyst solution from 1.2 were added to the aqueous solution from 1.1. After thorough mixing, 380 g of bisphenol A diglycidyl ether were added over the course of one hour and the mixture was held at 90° C. with stirring until epoxide groups were no longer detectable. By further addition of water, the product was diluted to a mass fraction of solids of 35%.

Example 2

Primers

The binder of 1.3 was used to formulate a cationic primer, a slurry of 62 g of an iron oxide pigment ®Bayferrox, Bayer AG), 106 g of a modified zinc phosphate ®Heucophos ZPO, Heubach), 55 g of a kaolin ®ASP 600, Engelhardt) and 55 g of a talc ®Talkum AT1, Norwegian Talc) being prepared in a mixture of 88 g of fully deionized water, 22 g of a commercial dispersant ®Additol VXW 6208, Solutia Austria GmbH) and 3 g of a commercial defoamer ®Surfynol SE-F, E. I. DuPont de Nemours) with the addition of 6 g of a thixotropic agent (®Luwothix HT, Lehmann & Voss) and 3 g of an acrylate thickener ®Acrysol RM 8/12 WA, Rohm & Haas). 480 g of the above binder solution in water were added to this slurry, and 3 g of a cobalt octoate siccative (as a 3% strength solution in water) and a further 117 g of water were added. The aqueous primer obtained had an efflux time (4 mm cup; DIN-EN-ISO 2431 or DIN 53 211) of approximately 30 s.

Comparative Examples (Examples 3 and 4)

For comparison, primer 3 (Example 3) based on an aqueous emulsion of an oxidatively drying epoxy resin ester ®Duroxyn VEF 4380, Solutia Austria GmbH) and conventional solventborne primer 4 (Example 4) based on a resin-acid-modified, medium-oil alkyd resin ®Vialkyd AM 404, Solutia Austria GmbH) were employed. Their formulations can be seen from Table 1 below.

TABLE 1

Composition of the primers

| Ingredients | Producer | Function | Primer 2 (inventive) | Primer 3 (epoxy resin ester) | Primer 4 (convenional alkyd resin primer) |
|---|---|---|---|---|---|
| | | Binder | from Example 1 480 g | ® Duroxyn VEF 4380 583 g | ® Vialkyd AM 404 350 g |
| Water | | Dilution | 88 g | | |
| AMP 90 | Angus | Neutralizing agent | | 2 g | |
| ® Additol VXW 6208 | Solutia Austria GmbH | Dispersant | 22 g | 6 g | 10 g |
| ® Surfynol SE-F | E. I. DuPont de Nemours | Defoamer | 3 g | 3 g | |
| ® Bayferrox 140 | Bayer AG | Iron oxide pigment | 62 g | 88 g | 99 g |
| ® Heucopohos ZPO | Heubach | Zinc phosphate | 106 g | 100 g | 101 g |
| ® ASP 600 | Engelhardt | Kaolin | 55 g | 60 g | 60 g |
| ® Talcum AT1 | Norwegian Talc | Talc | 55 g | 60 g | 60 g |
| ® Luwothix HT | Lehmann & Voss | Antisettling agent | 6 g | 6 g | 10 g |
| ® Acrysol RM 8/12 WA | Rohm & Haas | Thickener | 3 g | 10 g | |
| ® Additol XL 280 | Solutia Austria GmbH | Antisettling agent | | | 19 g |
| Cooctoate 3% strength aq. soln. | | Siccative | 3 g | 6 g | |
| Water | | Diluent | 117 g | 76 g | |
| Xylene | | Diluent | | | 278 g |
| Paint composition | | | 1000 g | 1000 g | 1000 g |

These primers were applied to industrial iron sheets (untreated) in a dry film thickness of approximately 30 μm by spraying (spray viscosity, measured as efflux time from the 4 mm cup in accordance with DIN EN ISO 2431: approximately 30 s). After a drying time of 10 days at room temperature, a corrosion test is conducted in accordance with DIN 50021. The results are summarized in Table 2:

TABLE 2

Results of the corrosion test

| Corrosion protection after exposure for | Primer 2 | Primer 3 (comparative) | Primer 4 (comparative) |
|---|---|---|---|
| 72 h | + | + | + |
| 144 h | + | 0 | + |
| 240 h | + | − | + |
| 480 h | + | | − |
| 720 h | + | | |

In this test the results were assessed as following in accordance with the standard: "very good": +; "adequate": 0; and "fail": −.

In comparison with known aqueous primers based on oxidatively drying epoxy resin esters and known conventional (solventborne) primers based on alkyd resin, the corrosion protection effect is considerably more favorable.

What is claimed is:

1. An aqueous binder for air-drying and physically drying coating materials which comprises organic bismuth compounds D and reaction products A'ABC of epoxy resins, fatty acids, and amines, which reaction products A'ABC are obtained by reacting epoxide compounds A' containing at least two epoxide groups per molecule and reaction products ABC of epoxide compounds A, fatty acids B having at least one olefinic double bond, and amines C, the number-average molar mass $M_n$ of the reaction products A'ABC being at least 5000 g/mol.

2. The aqueous binder as claimed in claim 1, wherein the epoxide compounds A' and the epoxide compounds A independently of one another are diepoxide or polyepoxide compounds having a specific epoxide group content of from 0.4 to 7 mol/kg.

3. The aqueous binder as claimed in claim 1, wherein the epoxide compounds A have a specific epoxide group content of from 0.5 to 4 mol/kg.

4. The aqueous binder as claimed in claim 1, wherein the epoxide compounds A' have a specific epoxide group content of from 2 to 5.9 mol/kg.

5. The aqueous binder as claimed in claim 1, wherein the epoxide compounds A' and the epoxide compounds A independently of one another are selected from epoxide compounds based on bisphenol A, epoxide compounds based on bisphenol F, and mixtures thereof.

6. The aqueous binder as claimed in claim 1, wherein fatty acids B are used in the reaction which have at least one olefinic double bond and have from 6 to 30 carbon atoms.

7. The aqueous binder as claimed in claim 1, wherein the amines C are aliphatic linear, cyclic or branched amines containing at least one primary or secondary amino group.

8. The aqueous binder as claimed in claim 1, wherein the epoxide compounds A' and/or the epoxide compounds A are modified by reaction with compounds E containing at least one acid group or hydroxyl group which is reactive toward epoxide groups, with the mole fraction of compounds E per 1 mol of epoxide compounds A and/or A' being from 0.02 to 0.3.

9. The aqueous binder as claimed in claim 8, wherein the compounds E are selected from the group consisting of aromatic hydroxy compounds, saturated aliphatic linear or branched carboxylic acids having from 2 to 40 carbon atoms, sulfonic acids, phosphoric acid, and alkyl- and arylphosphonic acids.

10. The aqueous binder as claimed in claim 1, wherein those amines C containing more than two amine hydrogen atoms are modified by reaction with aliphatic or aromatic monoepoxide compounds A" or mixtures thereof in a way that a primary amino group of the amine C is convened to a secondary amino group, or a secondary amino group of the amine C is converted to a tertiary amino group.

11. The aqueous binder as claimed in claim 10, wherein the monoepoxide compounds A" are selected from glycidyl ethers of monohydric alcohols or phenols and glycidyl esters of monobasic acids.

12. The aqueous binder as claimed in claim 10, wherein the monoepoxide compounds A" are selected from butyl glycidyl ether, 2-ethylhexyl glycidyl ether, the glycidyl ester of a mixture of $\alpha$-branched pentanoic acids, the glycidyl ester of a mixture of $\alpha$-branched decanoic acids, and glycidyl 2-ethylhexanoate.

13. A process for preparing the reaction products A'ABC of claim 1, which comprises in the first stage preparing an adduct ABC by reacting the epoxide compounds A, the fatty acids B having at least one olefinic double bond, and the amines C and in a second stage reacting said adduct ABC with epoxide compounds A' to give the reaction products A'ABC.

14. A process for preparing the reaction products A'ABC of claim 1, which comprises reacting in a first stage the epoxide compounds A and the fatty acids B having at least one olefinic double bond, to give an adduct AB which in a second stage is reacted with amines C to give an intermediate ABC, which in turn in a third stage reacts with the epoxide compounds A' to form the reaction product A'ABC.

15. A process for preparing the reaction products of claim 1, which comprises reacting in a first stage the epoxide compounds A with amines C to give an adduct AC which in a second stage is reacted with fatty acids B having at least one olefinic double bond, to give an intermediate ABC, which in turn in a third stage reacts with the epoxide compounds A' to form the reaction product A'ABC.

16. A method of the use of aqueous binder as claimed in claim 1 to prepare primers for protecting against corrosion, comprising adding bismuth compounds D to the reaction products A'ABC, adding, if desired, additives selected from defoamers, leveling assistants, thickeners, pigments, dispersants, and antisettling agents, and applying the resulting mixture to metal surfaces.

17. An anticorrosion primer composition comprising an aqueous binder as claimed in claim 1.

18. A sheet of a base metal, coated with an anticorrosion primer composition as claimed in claim 17.

* * * * *